United States Patent
Oh et al.

(10) Patent No.: US 12,215,042 B2
(45) Date of Patent: Feb. 4, 2025

(54) WASTEWATER PURIFICATION METHOD

(71) Applicant: LG Chem, Ltd., Seoul (KR)

(72) Inventors: Suk Yung Oh, Daejeon (KR); Yong Heon Cho, Daejeon (KR); Jung Su Han, Daejeon (KR); Jun Seok Ko, Daejeon (KR); Nam Young Yoon, Daejeon (KR); Sung Hwan Kim, Deajeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/017,794

(22) PCT Filed: Jul. 1, 2022

(86) PCT No.: PCT/KR2022/009529
§ 371 (c)(1),
(2) Date: Jan. 24, 2023

(87) PCT Pub. No.: WO2023/090563
PCT Pub. Date: May 25, 2023

(65) Prior Publication Data
US 2024/0246837 A1      Jul. 25, 2024

(30) Foreign Application Priority Data

Nov. 17, 2021 (KR) .......... 10-2021-0158785

(51) Int. Cl.
*C02F 1/04* (2023.01)
*C02F 1/66* (2023.01)
*C02F 101/16* (2006.01)

(52) U.S. Cl.
CPC .............. *C02F 1/048* (2013.01); *C02F 1/043* (2013.01); *C02F 1/66* (2013.01); *C02F 2101/16* (2013.01)

(58) Field of Classification Search
CPC .. C02F 1/043; C02F 1/048; C02F 1/66; C02F 2101/16
See application file for complete search history.

(56) References Cited

U.S. PATENT DOCUMENTS 3,708,958 A * 1/1973 Duty .................. B01D 53/1493
                                                261/117
4,060,591 A * 11/1977 Garber ...................... C01C 1/10
                                                95/158

(Continued)

FOREIGN PATENT DOCUMENTS

EP           3998251 A1    5/2022
EP           4206146 A1    7/2023

(Continued)

OTHER PUBLICATIONS

Espacenet Machine Translation of KR 20200078104 obtained Jun. 5, 2024. (Year: 2024).*

(Continued)

Primary Examiner — Jonathan Miller
(74) Attorney, Agent, or Firm — Lerner David LLP

(57) ABSTRACT

Provided is a wastewater purification method, the method including: supplying a first mixed stream, in which an acid component and wastewater including water, a nitrile-based monomer, and ammonia are mixed, to a first column; recovering the nitrile-based monomer from an upper discharge stream from the first column; supplying a second mixed stream, in which a lower discharge stream from the first column and a base component are mixed, to a second column; and recovering the ammonia from an upper discharge stream from the second column and separating purified wastewater.

10 Claims, 2 Drawing Sheets

(56) References Cited

U.S. PATENT DOCUMENTS

| | | | | |
|---|---|---|---|---|
| 4,111,759 | A * | 9/1978 | Didycz | B01D 3/38 |
| | | | | 203/96 |
| 4,594,131 | A * | 6/1986 | Maier | C01C 1/10 |
| | | | | 203/79 |
| 4,661,614 | A * | 4/1987 | Most | C07C 255/00 |
| | | | | 558/346 |
| 5,310,528 | A * | 5/1994 | Kuivalainen | B01D 53/501 |
| | | | | 422/267 |
| 6,355,828 | B1 | 3/2002 | Rogers et al. | |
| 2004/0181086 | A1 * | 9/2004 | Godbole | C07C 253/34 |
| | | | | 558/463 |
| 2004/0222078 | A1 | 11/2004 | Monical et al. | |
| 2010/0125147 | A1 | 5/2010 | Tong | |
| 2016/0075582 | A1 | 3/2016 | Knauf et al. | |
| 2018/0319949 | A1 * | 11/2018 | Lee | C08F 6/06 |
| 2019/0047945 | A1 | 2/2019 | Sano | |
| 2021/0002391 | A1 | 1/2021 | Yoshimura et al. | |
| 2021/0261437 | A1 * | 8/2021 | Yoshida | B01D 3/346 |
| 2022/0348536 | A1 * | 11/2022 | Shin | C07C 253/34 |
| 2023/0406740 | A1 * | 12/2023 | Sodeyama | C02F 1/048 |

FOREIGN PATENT DOCUMENTS

| | | |
|---|---|---|
| JP | S62-212357 A | 9/1987 |
| JP | H05230007 A | 9/1993 |
| JP | 2004526677 A | 9/2004 |
| JP | 2007039403 A | 2/2007 |
| JP | 2009196953 A | 9/2009 |
| JP | 5762300 B2 | 8/2015 |
| JP | 2017517381 A | 6/2017 |
| JP | 2018-533477 A | 11/2018 |
| KR | 20010071471 A | 7/2001 |
| KR | 20030052920 A | 6/2003 |
| KR | 20040042561 A | 5/2004 |
| KR | 20040065172 A | 7/2004 |
| KR | 20170141872 A | 12/2017 |
| KR | 20180055796 A | 5/2018 |
| KR | 20180096861 A | 8/2018 |
| KR | 20200013512 A | 2/2020 |
| KR | 20200078104 A | 7/2020 |
| KR | 20200135326 A | 12/2020 |
| KR | 20210036151 A | 4/2021 |
| WO | 9965583 A1 | 12/1999 |
| WO | 2015153190 A1 | 10/2015 |

OTHER PUBLICATIONS

Extended European Search Report for European Patent Application No. 22839623.0 dated Dec. 7, 2023. 9 pgs.

International Search Report for Application No. PCT/KR2022/009529 mailed Oct. 12, 2022, pp. 1-3. [See p. 2, categorizing the cited references].

* cited by examiner

[FIG. 1]
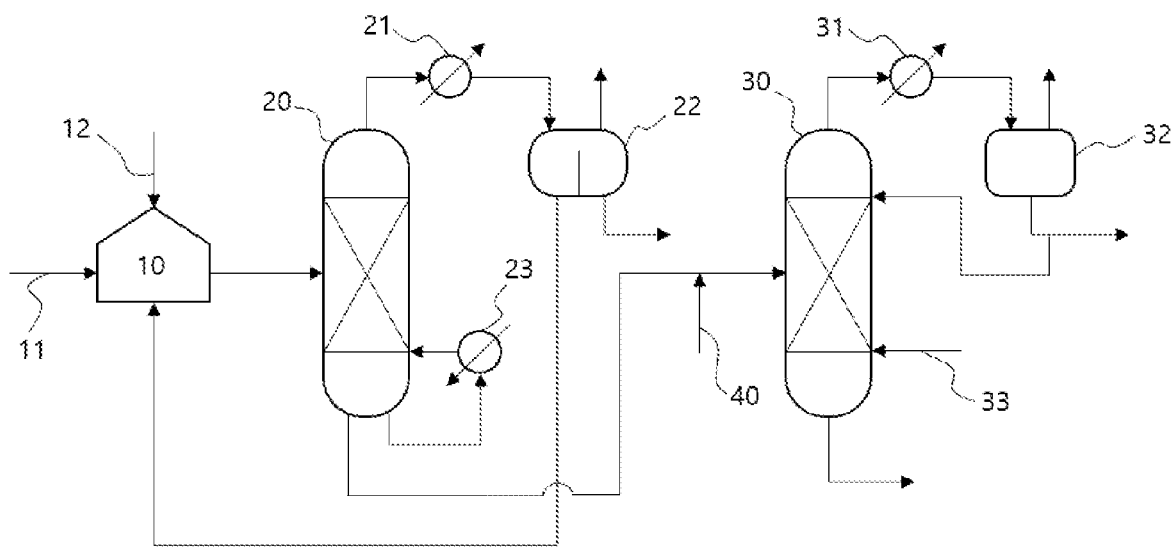
[FIG. 2]
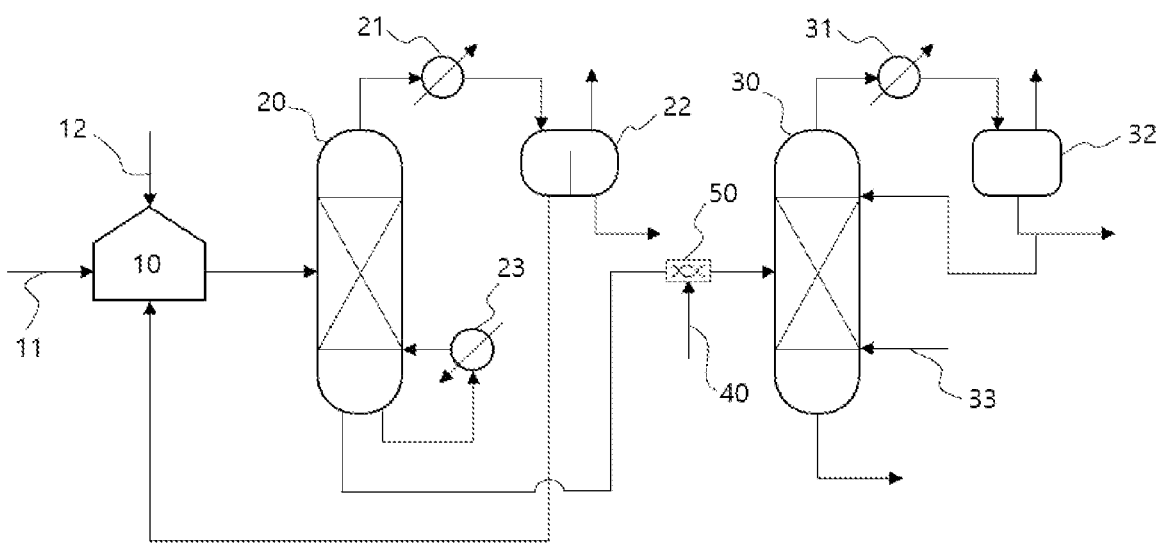

【FIG. 3】
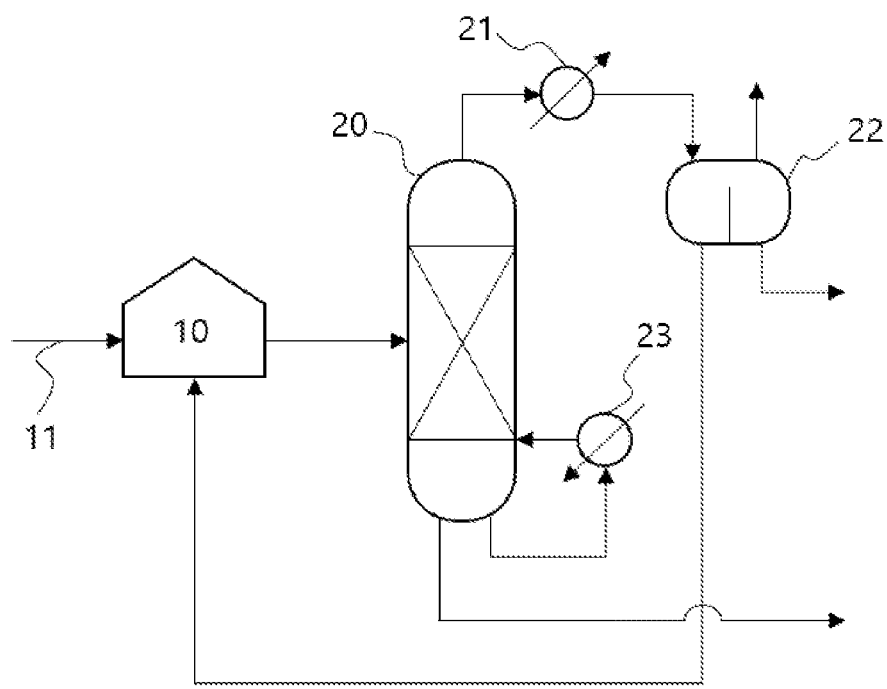

WASTEWATER PURIFICATION METHOD

CROSS-REFERENCE TO RELATED APPLICATIONS

The present application is a national phase entry under 35 U.S.C. § 371 of International Application No. PCT/KR2022/009529, filed Jul. 1, 2022, which claims priority from Korean Patent Application No. 10-2021-0158785, filed on Nov. 17, 2021, the disclosures of which are incorporated herein by reference.

TECHNICAL FIELD

The present invention relates to a wastewater purification method, and more particularly, to a method which may recover reusable components from wastewater in a purification step at a rear end of a polymerization reaction using a nitrile-based monomer and which may lower a total nitrogen content in the wastewater transferred to a wastewater tank.

BACKGROUND ART

In general, a nitrile-based rubber may be obtained by manufacturing a homopolymer or copolymer latex including a nitrile-based monomer-derived unit, using a nitrile-based monomer. An example of the nitrile-based rubber may include an acrylonitrile-butadiene copolymer latex manufactured by copolymerizing acrylonitrile and 1,3-butadiene.

The nitrile-based rubber may be manufactured by emulsion polymerization, and the emulsion polymerization may be a method of polymerizing a monomer in a solution state using a medium. The emulsion polymerization of the nitrile-based rubber may be performed by, for example, using water as a medium, performing polymerization by adding a nitrile-based monomer alone or further adding an additional monomer for copolymerization with the nitrile-based monomer, and manufacturing a homopolymer or copolymer latex including a nitrile-based monomer-derived unit therefrom.

The homopolymer or copolymer latex including the nitrile-based monomer-derived unit after polymerization is completed is transferred to a blowdown tank. An unreacted material and water may be vaporized to the upper portion in the blowdown tank and transferred to a wastewater tank.

Meanwhile, in the blowdown tank, ammonia is added for adjusting the pH of latex, and may be partly vaporized with water to the upper portion and transferred to the wastewater tank. In this case, in the wastewater tank, 2 mol of an unreacted nitrile-based monomer and 1 mol of ammonia react to produce a trimer, resulting in a loss of the nitrile-based monomer.

In addition, wastewater remaining after recovering the nitrile-based monomer from the wastewater is transferred to a wastewater treatment plant. Here, since a total nitrogen (TN) content in wastewater which is transferred to the wastewater treatment plant is very high, a lot of money should be invested in the wastewater treatment plant for treating the wastewater, and in the midst of stricter environmental regulations, a large loss occurs in the price competitiveness of a latex product.

DISCLOSURE

Technical Problem

An object of the present disclosure is to provide a method which may prevent a loss in recovering an unreacted nitrile-based monomer in a manufacturing process of a homopolymer or copolymer latex including a nitrile-based monomer-derived unit and which may minimize a total nitrogen content in wastewater transferred to a wastewater treatment plant, in order to solve the problems mentioned in Background Art.

Technical Solution

In one general aspect, a wastewater purification method includes: supplying a first mixed stream, in which an acid component and wastewater including water, a nitrile-based monomer, and ammonia are mixed, to a first column; recovering the nitrile-based monomer from an upper discharge stream from the first column; supplying a second mixed stream, in which a lower discharge stream from the first column and a base component are mixed, to a second column; and recovering the ammonia from an upper discharge stream from the second column and separating purified wastewater.

Advantageous Effects

According to the wastewater purification method of the present disclosure, the loss of an unreacted nitrile-based monomer may be minimized and the nitrile-based monomer may be recovered and reused in a manufacturing process of a homopolymer or copolymer latex including a nitrile-based monomer-derived unit, thereby increasing cost competitiveness.

In addition, ammonia may be recovered from the wastewater from which the unreacted nitrile-based monomer is recovered and reused, and a total nitrogen content in purified wastewater which is transferred to a wastewater treatment plant is effectively lowered, whereby the cost of investing in a wastewater treatment plant for a wastewater treatment may be reduced, and in the midst of stricter environmental regulations, the price competitiveness of a latex product may be increased.

DESCRIPTION OF DRAWINGS

FIGS. 1 and 2 are process flow diagrams according to the wastewater purification method in an exemplary embodiment of the present disclosure, respectively.

FIG. 3 is a process flow diagram according to the wastewater purification method in the comparative example.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "stream" in the present disclosure may refer to a fluid flow in a process, or may refer to a fluid itself flowing in a pipe. Specifically, the stream may refer to both a fluid itself flowing in a pipe connecting each device and a fluid flow. In addition, the fluid may include any one or more components of gas, liquid, and solid.

Hereinafter, the present disclosure will be described in more detail with reference to the FIGS. 1 and 2, for better understanding of the present disclosure.

According to the present disclosure, a wastewater purification method is provided. More specifically, the wastewater purification method may include: supplying a first mixed stream, in which an acid component and wastewater including water, a nitrile-based monomer, and ammonia are mixed, to a first column 20; recovering the nitrile-based monomer from an upper discharge stream from the first column 20; supplying a second mixed stream, in which a lower discharge stream from the first column 20 and a base component are mixed, to a second column 30; and recovering the ammonia from an upper discharge stream from the second column 30 and separating purified wastewater.

According to an exemplary embodiment of the present invention, the wastewater may be produced from a manufacturing process of a homopolymer or copolymer latex including a nitrile-based monomer-derived unit. Specifically, the manufacturing process of a homopolymer or copolymer latex including a nitrile-based monomer-derived unit may include a polymerization step and a purification step.

The polymerization step may be performed by emulsion polymerization. In the emulsion polymerization, water may be used as a medium, and polymerization may be performed by adding a nitrile-based monomer alone or further adding an additional monomer for copolymerization with the nitrile-based monomer. For example, the additional monomer may include a conjugated diene-based monomer.

The nitrile-based monomer may include one or more selected from the group consisting of acrylonitrile, methacrylonitrile, fumaronitrile, α-chloronitrile, and α-cyanoethyl acrylonitrile. As a specific example, the nitrile-based monomer may be acrylonitrile.

The conjugated diene-based monomer may include one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene.

The purification step may be a step of separating an unreacted material and water from the homopolymer or copolymer latex including the nitrile-based monomer-derived unit after the polymerization is completed. Specifically, the homopolymer or copolymer latex including the nitrile-based monomer-derived unit after the polymerization is completed is transferred to a blowdown tank, and in the blowdown tank, the unreacted material and water may be vaporized to the upper portion and transferred to a wastewater tank 10.

In the blowdown tank, ammonia should be added for adjusting the pH of latex. However, in the process of vaporizing the unreacted material and water and transferring them to the wastewater tank 10 in the blowdown tank, a part of ammonia is vaporized with water and introduced to the wastewater tank 10. Thus in the wastewater tank 10, 2 mol of an unreacted nitrile-based monomer and 1 mol of ammonia react to produce a trimer referred to as 3,3-iminodipropionitrile, resulting in a loss of the nitrile-based monomer.

In addition, remaining wastewater after recovering the nitrile-based monomer from the wastewater tank is transferred to a wastewater treatment plant. Since a total nitrogen content in the wastewater transferred to the wastewater treatment plant is very high, a lot of money should be invested in the wastewater treatment plant for treating the wastewater, and in the midst of stricter environmental regulations, the price competitiveness of a latex product is decreased.

For this, the present disclosure was intended to provide a method for minimizing the loss of an unreacted nitrile-based monomer and a total nitrogen content in wastewater to reduce costs for a wastewater treatment and improve the price competitiveness of a latex product.

According to an exemplary embodiment of the present invention, the wastewater tank 10 may be supplied with wastewater including water, a nitrile-based monomer, and ammonia through a wastewater transfer line 11. In addition, an acid component may be added to the wastewater tank 10 through an acid component transfer line 12. The acid component is not particularly limited, and for example, may include one or more selected from the group consisting of acetic acid, nitric acid, sulfuric acid, phosphoric acid, formic acid, and cyanic acid. As a specific example, the acid component may be acetic acid.

From the wastewater tank 10, a first mixed stream, in which the acid component and the wastewater including water, a nitrile-based monomer, and ammonia are mixed, may be discharged, and the first mixed stream may be supplied to a first column 20.

The first mixed stream may be in a state in which the wastewater is mixed with the acid component so that the pH of the wastewater is lowered. For example, the pH of the first mixed stream may be 1.5 or more, 2.5 or more, or 3.5 or more and 4.5 or less, 5 or less, or 5.5 or less. By adjusting the pH of the first mixed stream to the above range, ammonia ($NH_3$) in the first mixed stream is converted into an ammonium salt ($NH_4^+$) to prevent formation of a trimer due to a side reaction of the nitrile-based monomer and ammonia, thereby decreasing the loss of the nitrile-based monomer.

According to an exemplary embodiment of the present invention, the first mixed stream is supplied to the first column 20, the nitrile-based monomer included in the first mixed stream may be recovered in the first column 20, and the remaining components may be supplied to a second column 30.

In the first column 20, the components of the first mixed stream are separated by distillation, and the nitrile-based monomer may be recovered from an upper discharge stream from the first column 20. Specifically, the upper discharge stream from the first column 20 may be condensed in a condenser 21 and then supplied to a decanter 22. From the decanter 22, flare gas is discharged, and the condensed upper discharge stream from the first column 20 may be separated into a water layer and an organic layer. The water layer components separated in the decanter 22 may be transferred to the wastewater tank 10, and the organic layer components including the nitrile-based monomer may be recovered and reused in a polymerization step of a manufacturing process of a homopolymer or copolymer latex including the nitrile-based monomer-derived unit.

A part of the lower discharge stream from the first column 20 may be heated in a common reboiler 23 and then refluxed to the first column 20.

Since the nitrile-based monomer in the wastewater is recovered in the first column 20, the total nitrogen content in the wastewater may be decreased. For example, a ratio of a total nitrogen content in the lower discharge stream from the first column 20 to a total nitrogen content in the wastewater may be 0.25 or more, 0.3 or more, or 0.35 or more and 0.5 or less or 0.55 or less.

An operating temperature of the first column 20 may be 80° C. or higher, 90° C. or higher, or 95° C. or higher and 100° C. or lower, 110° C. or lower, or 130° C. or lower. When the operating temperature of the first column is higher than 130° C., polymer production is accelerated by self-polymerization of acrylonitrile, and thus, fouling in a device may be caused to make process operation impossible.

In addition, an operating pressure of the first column 20 may be 0.5 bar or more, 0.7 bar or more, or 0.9 bar or more and 1.5 bar or less, 2 bar or less, or 3 bar or less. By controlling the operating conditions of the first column 20 to the above ranges, the nitrile-based monomer may be effectively separated to the upper portion.

According to an exemplary embodiment of the present invention, the lower discharge stream from the first column 20 may be supplied to the second column 30. Specifically, the lower discharge stream from the first column may include the remaining components after the nitrile-based monomer is recovered from the wastewater, for example, water and an ammonium salt.

The lower discharge stream from the first column 20 may be mixed with a base component before being supplied to the second column 30 to form a second mixed stream, and the second mixed stream may be supplied to the second column 30.

Referring now to FIG. 2, in an area in which the lower discharge stream from the first column 20 and the base component are mixed to form the second mixed stream, a line mixer 50 may be provided. Specifically, the lower discharge stream from the first column 20 is transferred through a line which connects the first column 20 to the second column 30, and a base component transfer line 40 which transfers the base component may be joined at an arbitrary point of a line connecting the first column 20 to the second column 30. Here, the line mixer 50 is provided in an area in which the line connecting the first column 20 to the second column 30 and the base component transfer line 40 are joined to form the second mixed stream, whereby the lower discharge stream from the first column 20 and the base component may be effectively mixed in a short time by vortex formation, and a mixing device occupying a separate work space is not required. In addition, the lower discharge stream from the first column 20 and the base component are effectively mixed by the line mixer 50, thereby converting most of the ammonium salt into ammonia before the second mixed stream is supplied to the second column 30.

The base component is not particularly limited, and for example, may include one or more selected from the group consisting of sodium hydroxide, potassium hydroxide, calcium hydroxide, and barium hydroxide. As a specific example, the base component may be sodium hydroxide.

The second mixed stream may be in a state of having an increased pH since the lower discharge stream from the first column 20 is mixed with the base component. For example, the pH of the second mixed stream may be 8 or more, 8.5 or more, or 9 or more and 12 or less, 12.5 or less, 13 or less, or 13.5 or less. By adjusting the pH of the second mixed stream to the above range, an ammonium salt ($NH_4^+$) in the second mixed stream is converted into ammonia ($NH_3$), and the ammonia may be recovered in the second column 30 and reused.

According to an exemplary embodiment of the present invention, the second mixed stream may be supplied to a dispenser installed in the upper portion of the second column 30. In the second column 30, ammonia and water in the second mixed stream may be separated by distillation. Specifically, ammonia is recovered from an upper discharge stream, and purified wastewater may be separated as a lower discharge stream, in the second column 30.

A steam supply unit 33 may be provided in a lower portion of the second column 30. Specifically, steam may be supplied by the steam supply unit 33 provided in a lower portion of the second column 30, without installing a common reboiler, as a means for supplying heat to the second column 30. Thus, it is not necessary to install a reboiler in the lower portion of the second column 30 and fouling, which occurs by partial precipitation of salts in or outside a pipe of the reboiler when the reboiler is installed, may be prevented.

The steam supply unit 33 may include a steam transfer pipe which transfers steam to the second column 30 and one or more spray nozzles, each of which is provided in the steam transfer pipe and sprays steam into the second column 30.

Each of the one or more spray nozzles may be configured to spray steam downwards. Specifically, the spray nozzles are each installed in a lower portion of the steam transfer pipe and may each spray steam downwards. By directly spraying steam downwards inside the second column 30, the steam may be evenly dispersed in and mixed with wastewater inside the second column 30 to improve the separation efficiency of ammonia in the second column 30 to lower the total nitrogen content in the purified wastewater.

A ratio of a flow rate of steam added to the steam supply unit 33 to a flow rate of the second mixed stream supplied to the second column 30 may be, for example, 0.01 or more, 0.05 or more, or 0.1 or more and 0.3 or less, 1 or less, 2 or less, 5 or less, or 10 or less. Within the range, a volatilization degree of ammonia is adjusted to increase separation efficiency, thereby lowering the total nitrogen content in the purified wastewater.

An operating temperature of the second column 30 may be 80° C. or higher, 90° C. or higher, 95° C. or higher, or 99° C. or higher and 100° C. or lower, 105° C. or lower, 110° C. or lower, or 130° C. or lower. When the operating temperature of the second column 30 is higher than 130° C., the capacity of a heat exchanger required to transfer the lower discharge stream from the second column 30 to the wastewater treatment plant is increased, which is unfavorable in terms of facility investment costs and operating costs.

In addition, an operating pressure of the second column 30 may be 0.5 bar or more, 0.7 bar or more, or 0.9 bar or more and 1.5 bar or less, 2 bar or less, or 3 bar or less. By controlling the operating conditions of the second column 30 to the above range, the separation efficiency of ammonia may be increased to lower the total nitrogen content in the purified wastewater.

A packing height of the second column may refer to a height of a packing material cluster where a gas-liquid contact occurs in the second column 30. The packing height may be, for example, 2 m or higher, 4 m or higher, 6 m or higher, or 10 m or higher and 15 m or less, 20 m or less, or 25 m or less.

When the packing height is at least 2 m or higher, an effect of reducing the total nitrogen content in wastewater may be obtained. When the packing height is higher than 25 m, a difference in the total nitrogen content reduction amount is not large as compared with the packing height of 25 m or lower, but equipment costs for columns and column structures therefor are increased.

By steam spraying through the steam supply unit 33, ammonia may be volatilized to the upper portion in the column. The volatilized ammonia is discharged as the upper discharge stream from the second column 30, and the upper discharge stream from the second column 30 may be condensed in a condenser 31 and then supplied to a reflux tank 32.

Flare gas is discharged to the upper portion in the reflux tank 32, a part of the lower discharge stream including ammonia is refluxed to the second column 30, and the remaining may be recovered and reused for pH adjustment of latex. Here, a part of the lower discharge stream of the reflux tank 32 is refluxed, thereby increasing the concentration of ammonia in recovered ammonia, and thus, it may be easy to control a process recipe when reused.

Through lower discharge stream from the second column 30, remaining purified wastewater from which the nitrile-based monomer and ammonia have been separated may be discharged, which may be transferred to the wastewater treatment plant. Here, a ratio of the total nitrogen content in the lower discharge stream from the second column 30 to the total nitrogen content in wastewater may be 0.01 or more, 0.05 or more, or 0.08 or more and 0.11 or less, 0.13 or less, or 0.15 or less. Specifically, when wastewater produced in the manufacturing process of a homopolymer or copolymer latex including the nitrile-based monomer-derived unit is purified by the wastewater purification method according to the present disclosure, recovery and reuse are possible while decreasing the loss of the nitrile-based monomer in wastewater, ammonia may be recovered and reused, and the total nitrogen content in wastewater when the wastewater is transferred to the wastewater treatment plant may be effectively decreased.

According to an exemplary embodiment of the present invention, in the wastewater purification method, if necessary, devices such as a distillation tower, a condenser, a reboiler, a valve, a pump, a separator, a mixer, and the like may be further installed.

Hereinabove, the wastewater purification method according to the present disclosure has been described and illustrated in the drawings, but the description and the illustration in the drawings are the description and the illustration of only core constitutions for understanding of the present disclosure, and in addition to the process and devices described above and illustrated in the drawings, the process and the devices which are not described and illustrated separately may be appropriately applied and used for carrying out the wastewater purification method according to the present disclosure.

Hereinafter, the present disclosure will be described in more detail by the Examples. However, the following Examples are provided for illustrating the present invention, and it is apparent to a person skilled in the art that various modifications and alterations may be made without departing from the scope and spirit of the present invention and the scope of the present invention is not limited thereto.

EXAMPLES

Example 1

According to the process diagram illustrated in FIG. 1, wastewater discharged from a manufacturing process of an acrylonitrile-butadiene copolymer latex was purified.

Specifically, wastewater, which included water, an acrylonitrile monomer, and ammonia and had a pH of 8, was supplied to a wastewater tank 10 through a wastewater transfer line 11, acetic acid was added to the wastewater tank 10 through an acid component transfer line 12, and a first mixed stream discharged from the wastewater tank 10 was supplied to a first column 20. At this time, it was confirmed that the total nitrogen content of the wastewater was 6,000 ppm and the pH of the first mixed stream was 5.5, and total nitrogen content was measured using a commercialized total nitrogen (TN) measuring device.

The upper discharge stream from the first column 20 was condensed in a condenser 21 and supplied to a decanter 22, flare gas was discharged from the decanter 22, separation into a water layer and an organic layer was performed, an acrylonitrile monomer was recovered from the organic layer component and reused, and a water layer component was transferred to the wastewater tank 10. In addition, a part of the lower discharge stream from the first column 20 was heated using a reboiler 23 and refluxed, and the rest was mixed with sodium hydroxide transferred through a base component transfer line 40 to form a second mixed stream and then supplied to a second column 30. At this time, the operating temperature of the first column 20 was 95° C., and the operating pressure was adjusted to 1 bar.

In addition, it was confirmed that the total nitrogen content of the lower discharge stream from the first column 20 was 3,000 ppm, and the pH of the second mixed stream was 10.

In the second column 30, the components of the second mixed stream were separated while a ratio of the flow rate of steam supplied to the flow rate of the second mixed stream supplied to the second column 30 by the steam supply unit 33 configured to spray steam upwards was adjusted to 0.1. The upper discharge stream from the second column 30 was condensed in a condenser 31 and then supplied to a reflux tank 32, flare gas was discharged from the reflux tank 32, a part of the lower discharge stream was refluxed, and ammonia was recovered from the remaining and reused. In addition, the lower discharge stream from the second column 30 was transferred to a wastewater treatment plant as purified wastewater. At this time, the operating temperature of the second column 30 was 99° C., the operating pressure thereof was adjusted to 1 bar, and a packing height was adjusted to 10 m. In addition, the total nitrogen content in the purified wastewater transferred to the wastewater treatment plant was confirmed to be 500 ppm. In addition, a recovery rate of acrylonitrile which was calculated from a ratio of the content of the acrylonitrile monomer recovered in the first column 20 to the content of the acrylonitrile monomer included in wastewater tank supplied to the wastewater tank 10 was confirmed to be 99.9%.

Example 2

According to the process diagram illustrated in FIG. 2, wastewater discharged from the manufacturing process of an acrylonitrile-butadiene copolymer latex was purified.

Specifically, the process was performed in the same manner as in Example 1, except that a line mixer 50 was used when the lower discharge stream from the first column 20 and sodium hydroxide were mixed. In this case, the total nitrogen content in the purified wastewater transferred to the wastewater treatment plant was confirmed to be 300 ppm. In addition, the recovery rate of acrylonitrile was confirmed to be 99.9%.

Thus, by installing the line mixer 50 in mixing the lower discharge stream from the first column 20 with caustic soda, the conversion rate of an ammonium salt in the lower discharge stream from the first column 20 into ammonia was increased to increase the amount of ammonia recovered in the second column 30, and thus, it was confirmed that the total nitrogen content in purified wastewater transferred to the wastewater treatment plant was decreased as compared with Example 1.

Example 3

The process was performed in the same manner as in Example 1, except that a steam supply unit 33 was configured so that steam was sprayed downwards in the second column 30. In this case, the total nitrogen content in the purified wastewater transferred to the wastewater treatment plant was confirmed to be 300 ppm. In addition, the recovery rate of acrylonitrile was confirmed to be 99.9%.

Thus, when steam was sprayed downwards by the steam supply unit 33 in the second column 30, it was confirmed that the dispersion and mixing efficiencies of wastewater in the second column 30 were increased to show an effect of decreasing the total nitrogen content in purified wastewater as compared with Example 1.

Example 4

According to the process diagram illustrated in FIG. 2, wastewater discharged from the manufacturing process of an acrylonitrile-butadiene copolymer latex was purified.

Specifically, the process was performed in the same manner as in Example 1, except that a line mixer 50 was used when the lower discharge stream from the first column 20 and sodium hydroxide were mixed, and a steam supply unit 33 was configured so that steam was sprayed downwards in the second column 30. In this case, the total nitrogen content in the purified wastewater transferred to the wastewater treatment plant was confirmed to be 100 ppm. In addition, the recovery rate of acrylonitrile was confirmed to be 99.9%.

Thus, the total nitrogen content in the purified wastewater was decreased by installing the line mixer 50 and also steam was sprayed downwards by the steam supply unit 33, thereby increasing the separation dispersion and mixing efficiencies of wastewater in the second column 30, and the pH of the second mixed stream was made uniform by the line mixer to increase the conversion efficiency of an ammonium salt into thereby ammonia, more effectively decreasing the nitrogen content remaining in the purified wastewater.

Example 5

The process was performed in the same manner as in Example 4, except that the pH of the first mixed stream was controlled to 5.5. In this case, the recovery rate of acrylonitrile was confirmed to be 99.9%.

Example 6

The process was performed in the same manner as in Example 4, except that the pH of the first mixed stream was controlled to 6. In this case, the recovery rate of acrylonitrile was confirmed to be 90%.

Example 7

The process was performed in the same manner as in Example 4, except that the pH of the first mixed stream was controlled to 6.5. In this case, the recovery rate of acrylonitrile was confirmed to be 60%.

Example 8

The process was performed in the same manner as in Example 4, except that the pH of the first mixed stream was controlled to 7. In this case, the recovery rate of acrylonitrile was confirmed to be 30%.

Referring to Examples 4 to 8, it was confirmed that when the pH of the first mixed stream supplied to the first column 20 was controlled to 5.5 or less, the recovery rate of acrylonitrile was high, as compared with the case when the pH of the first mixed stream supplied to the first column 20 was more than 5.5.

Example 9

The process was performed in the same manner as in Example 4, except that the pH of the second mixed stream at the rear end of the line mixer was controlled to 8. In this case, the total nitrogen content in the purified wastewater was confirmed to be 200 ppm.

Example 10

The process was performed in the same manner as in Example 4, except that the pH of the second mixed stream at the rear end of the line mixer was controlled to 9. In this case, the total nitrogen content in the purified wastewater was confirmed to be 150 ppm.

Example 11

The process was performed in the same manner as in Example 4, except that the pH of the second mixed stream at the rear end of the line mixer was controlled to 11. In this case, the total nitrogen content in the purified wastewater was confirmed to be 100 ppm.

Example 12

The process was performed in the same manner as in Example 4, except that the pH of the second mixed stream at the rear end of the line mixer was controlled to 12. In this case, the total nitrogen content in the purified wastewater was confirmed to be 100 ppm.

Referring to Examples 4 and 9 to 12, it was confirmed that when the pH of the second mixed stream at the rear end of the line mixer was 10 or more, the efficiency of removing nitrogen in wastewater was high.

Example 13

The process was performed in the same manner as in Example 4, except that the packing height of the second column 30 was controlled to 3 m. In this case, the total nitrogen content in the purified wastewater was confirmed to be 500 ppm.

Example 14

The process was performed in the same manner as in Example 4, except that the packing height of the second column 30 was controlled to 5 m. In this case, the total nitrogen content in the purified wastewater was confirmed to be 200 ppm.

Example 15

The process was performed in the same manner as in Example 4, except that the packing height of the second column 30 was controlled to 15 m. In this case, the total nitrogen content in the purified wastewater was confirmed to be 100 ppm.

Example 16

The process was performed in the same manner as in Example 4, except that the packing height of the second column 30 was controlled to 20 m. In this case, the total nitrogen content in the purified wastewater was confirmed to be 100 ppm.

Referring to Examples 4 and 13 to 16, it was confirmed that when the packing height of the second column 30 was controlled to 10 m to 20 m, the efficiency of removing nitrogen in wastewater was high.

Example 17

The process was performed in the same manner as in Example 4, except that a ratio of the flow rate of steam supplied to the flow rate of the second mixed stream supplied to the second column 30 was controlled to 0.03. In this case, the total nitrogen content in the purified wastewater was confirmed to be 1000 ppm.

Example 18

The process was performed in the same manner as in Example 4, except that a ratio of the flow rate of steam supplied to the flow rate of the second mixed stream supplied to the second column 30 was controlled to 0.05. In this case, the total nitrogen content in the purified wastewater was confirmed to be 300 ppm.

Example 19

The process was performed in the same manner as in Example 4, except that a ratio of the flow rate of steam supplied to the flow rate of the second mixed stream supplied to the second column 30 was controlled to 0.2. In this case, the total nitrogen content in the purified wastewater was confirmed to be 100 ppm.

Example 20

The process was performed in the same manner as in Example 4, except that a ratio of the flow rate of steam supplied to the flow rate of the second mixed stream supplied to the second column 30 was controlled to 0.3. In this case, the total nitrogen content in the purified wastewater was confirmed to be 100 ppm.

Referring to Examples 4 and 17 to 20, it was confirmed that when the ratio of the flow rate of steam supplied to the flow rate of the second mixed stream supplied to the second column 30 was controlled to 0.1 to 0.3, the efficiency of removing nitrogen in wastewater was high.

Example 21

The process was performed in the same manner as in Example 4, except that the operating temperature of the first column 20 was adjusted to 80° C. In this case, the recovery rate of acrylonitrile was confirmed to be 70%.

Example 22

The process was performed in the same manner as in Example 4, except that the operating temperature of the first column 20 was adjusted to 85° C. In this case, the recovery rate of acrylonitrile was confirmed to be 90%.

Example 23

The process was performed in the same manner as in Example 4, except that the operating temperature of the first column 20 was adjusted to 90° C. In this case, the recovery rate of acrylonitrile was confirmed to be 98%.

Example 24

The process was performed in the same manner as in Example 4, except that the operating temperature of the first column 20 was adjusted to 100° C. In this case, the recovery rate of acrylonitrile was confirmed to be 99.9%. Referring to Examples 4 and 21 to 24, it was confirmed that when the operating temperature of the first column 20 was 90° C. or higher, the acrylonitrile recovery rate was high.

Example 25

The process was performed in the same manner as in Example 4, except that the operating temperature of the second column 30 was adjusted to 80° C. In this case, the total nitrogen content in the purified wastewater was confirmed to be 1000 ppm.

Example 26

The process was performed in the same manner as in Example 4, except that the operating temperature of the second column 30 was adjusted to 85° C. In this case, the total nitrogen content in the purified wastewater was confirmed to be 500 ppm.

Example 27

The process was performed in the same manner as in Example 4, except that the operating temperature of the second column 30 was adjusted to 90° C. In this case, the total nitrogen content in the purified wastewater was confirmed to be 300 ppm.

Example 28

The process was performed in the same manner as in Example 4, except that the operating temperature of the second column 30 was adjusted to 105° C. In this case, the total nitrogen content in the purified wastewater was confirmed to be 100 ppm.

Referring to Examples 4 and 25 to 28, it was confirmed that when the operating temperature of the second column 30 was controlled to 95° C. or higher, the efficiency of removing nitrogen in wastewater was high.

COMPARATIVE EXAMPLES

Comparative Example 1

According to the process diagram illustrated in FIG. 3, wastewater discharged from the manufacturing process of an acrylonitrile-butadiene copolymer latex was purified.

Specifically, wastewater which included water, an acrylonitrile monomer, and ammonia and had a pH of 8 was supplied to the wastewater tank 10 through the wastewater transfer line 11, and the wastewater was discharged from the wastewater tank 10 and supplied to the first column 20. At this time, the total nitrogen content of the wastewater was confirmed to be 6,000 ppm.

The upper discharge stream from the first column 20 was condensed in the condenser 21 and supplied to the decanter 22, flare gas was discharged from the decanter 22, separation into a water layer and an organic layer was performed, an acrylonitrile monomer was recovered from the organic layer component and reused, and a water layer component was transferred to the wastewater tank 10. In addition, a part of the lower discharge stream from the first column 20 was heated using the reboiler 23 and then refluxed, and the rest was transferred to the wastewater treatment plant as purified wastewater. At this time, the operating temperature of the first column 20 was 95° C., and the operating pressure thereof was adjusted to 1 bar. In addition, the total nitrogen content in the purified wastewater transferred to the wastewater treatment plant was confirmed to be 3000 ppm. In addition, the recovery rate of acrylonitrile was confirmed to be 30%.

The invention claimed is:

1. A wastewater purification method comprising:
supplying a first mixed stream, in which an acid component and wastewater including water, a nitrile-based monomer, and ammonia are mixed, to a first column;
recovering the nitrile-based monomer from an upper discharge stream from the first column;
supplying a second mixed stream, in which a lower discharge stream from the first column and a base component are mixed, to a second column;
recovering the ammonia from an upper discharge stream from the second column and separating purified wastewater
wherein the wastewater is produced from a manufacturing process of a homopolymer or copolymer latex including the nitrile-based monomer-derived unit, and
wherein a pH of the first mixed stream ranges from 1.5 to 5.5.

2. The wastewater purification method of claim 1, wherein the acid component is one or more selected from the group consisting of acetic acid, nitric acid, sulfuric acid, phosphoric acid, formic acid, and cyanic acid.

3. The wastewater purification method of claim 1, wherein a pH of the second mixed stream is 8 to 13.5.

4. The wastewater purification method of claim 1, wherein the base component is one or more selected from the group consisting of sodium hydroxide, potassium hydroxide, calcium hydroxide, and barium hydroxide.

5. The wastewater purification method of claim 1, wherein a line mixer is provided in an area in which the lower discharge stream from the first column and the base component are mixed to form the second mixed stream.

6. The wastewater purification method of claim 1, wherein the second column includes a steam supply unit provided in a lower portion,
wherein the steam supply unit includes a steam transfer pipe which transfers steam to the second column and one or more spray nozzles, each of which is provided in the steam transfer pipe and sprays steam into the second column, and
wherein each of the one or more spray nozzles is configured to spray the steam downwards.

7. The wastewater purification method of claim 6, wherein a ratio of a flow rate of steam added to the steam supply unit to a flow rate of the second mixed stream supplied to the second column is 0.01 to 10.

8. The wastewater purification method of claim 1, wherein an operating temperature of the first column is 80° C. to 130° C., and an operating pressure of the first column is 0.5 bar to 3 bar.

9. The wastewater purification method of claim 1, wherein an operating temperature of the second column is 80° C. to 130° C., and an operating pressure of the second column is 0.5 bar to 3 bar.

10. The wastewater purification method of claim 1, wherein a packing height of the second column is 2 m to 25 m.

* * * * *